United States Patent [19]
Braden

[11] Patent Number: 5,246,239
[45] Date of Patent: Sep. 21, 1993

[54] HAND TRUCK WITH PIVOTABLE PLATFORM

[76] Inventor: Willis W. Braden, 4595 Hartel, Beaumont, Tex. 77705

[21] Appl. No.: 26,584

[22] Filed: Mar. 5, 1993

[51] Int. Cl.$^5$ .................................................. B62B 1/04
[52] U.S. Cl. .............................. 280/47.24; 280/47.28; 280/652
[58] Field of Search ............... 280/641, 645, 651, 652, 280/659, 47.17, 47.18, 47.24, 47.26, 46, 47.28, 47.29, 653

[56] References Cited

U.S. PATENT DOCUMENTS

| | | | |
|---|---|---|---|
| 1,299,829 | 4/1919 | Goodyear | 280/47.24 |
| 3,467,405 | 9/1969 | Fogg | 280/47.24 |
| 3,698,736 | 10/1972 | Shape | 280/47.29 |
| 4,048,735 | 9/1977 | Bruntg | 280/47.24 |
| 4,826,388 | 5/1989 | Golding | 280/47.24 |
| 5,123,666 | 6/1992 | Moore | 280/47.28 |

FOREIGN PATENT DOCUMENTS

| | | |
|---|---|---|
| 2445787 | 8/1980 | France . |
| 2493251 | 5/1982 | France . |
| 2180801 | 4/1987 | United Kingdom . |
| 88/07951 | 10/1988 | World Int. Prop. O. . |

Primary Examiner—Richard M. Camby
Attorney, Agent, or Firm—Richard C. Litman

[57] ABSTRACT

A manually operated hand truck provides for the level carriage of a load supported on the platform thereof by allowing the platform support bar to pivot relative to the handle and central portion of the apparatus. A spring connects the platform with the central portion of the apparatus to draw the handle to a vertical position when the platform is resting on the surface. However, the spring is of insufficient tension to raise the platform when the handle is tilted downward from the vertical, thus allowing the platform to remain on the surface. The platform may thus be slipped under a cooperating pallet supporting a load thereon, or other load, and the handle tilted back without displacing the platform and the load thereon from a level attitude. Thus, loads may be transported by pushing or pulling on the inclined handle, without displacing the load from the horizontal or spilling the load. The hand truck also provides increased stability due to a relatively wide span between wheels, and by allowing the axle to be upwardly displaced in a series of axle passages, providing for the installation of larger wheels without raising the center of gravity.

16 Claims, 3 Drawing Sheets

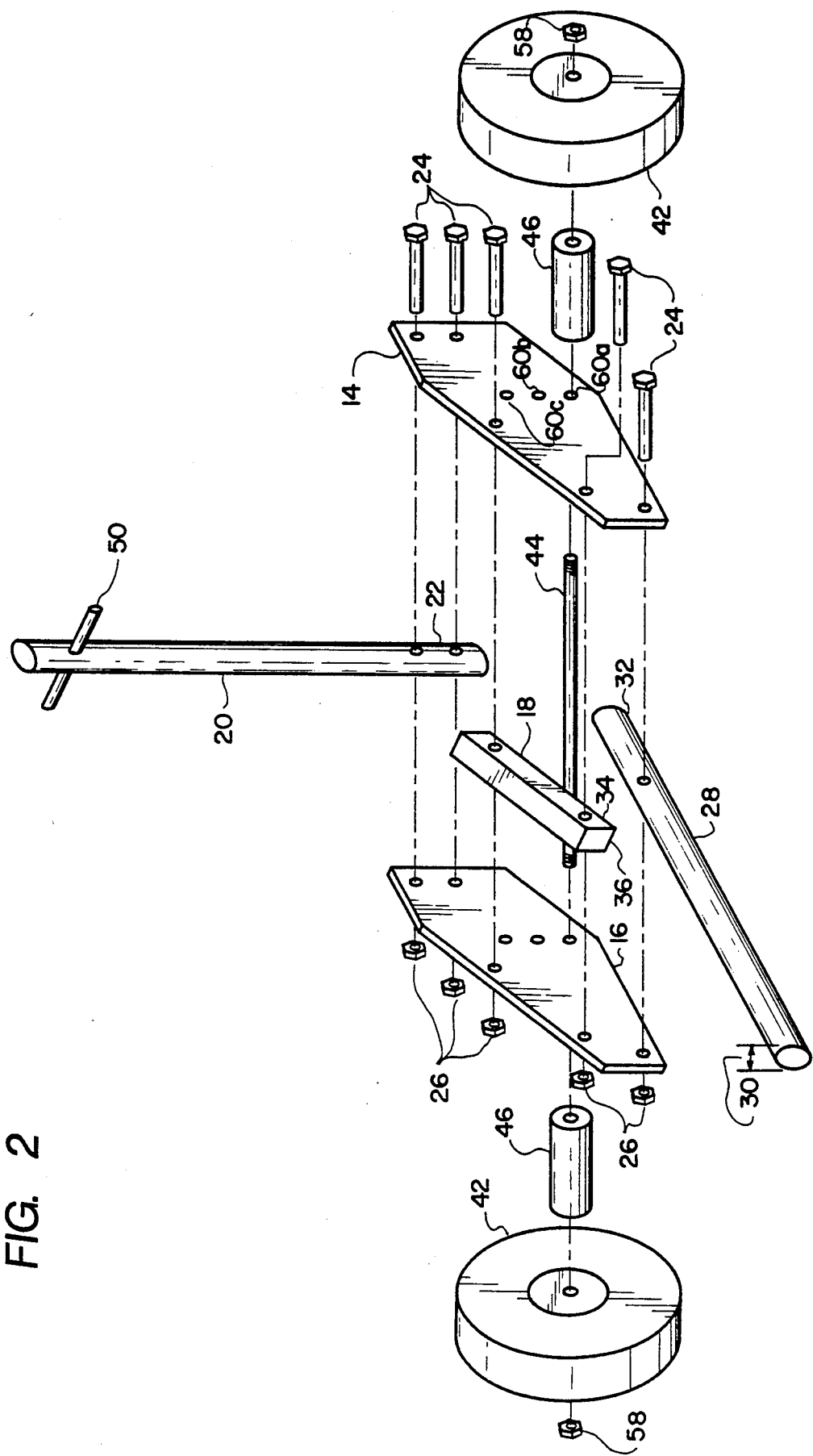

HAND TRUCK WITH PIVOTABLE PLATFORM

FIELD OF THE INVENTION

The present invention relates generally to hand trucks, carts, and dollies providing for the manual transport of loads and articles, and more specifically to a hand truck and lift system which provides a platform which is pivotable relative to the handle and base to allow a load carried upon the platform to remain level and to provide for more compact storage, as well as other advantages.

BACKGROUND OF THE INVENTION

Hand trucks, wheeled manually operated carts and dollies, and other similar devices enjoy great popularity for use in transporting relatively light loads from place to place over relatively short distances, due to their relatively small size and light weight. However, as these devices generally must be capable of lifting weights up to a few hundred pounds, they are generally constructed in a very sturdy manner and provide little, if any, adjustability for different size loads or persons using these devices. Such hand trucks and carts are generally limited to a relatively narrow environment due to their general inability to be quickly and easily adjusted or modified for different purposes.

A particularly annoying feature of many such trucks and carts is their relatively short lifting platform. Such relatively short platforms serve to provide relatively good leverage when lifting a load back over the wheels, but are relatively limited in their use with loads of larger dimensions. On the other hand, trucks and carts with longer or wider platforms are available, but problems arise when attempting to lift larger loads due to the handle which is generally at right angles to the lift platform and therefore is awkward to use with heavy loads, and also when storing the devices due to the size of the platforms. Moreover, when a load is placed upon the lifting platform of such hand trucks and the handle is tilted to move the load, the load will also tilt due to the fixed relationship of the various components of the truck. This can lead to problems in the case of loads which must be kept level in order to prevent spillage or damage thereto.

Various hand trucks, carts and dollies have been developed to respond to different specialized needs, as will be discussed in the Description of the Prior Art below, but none provide the versatility desired of such devices in many environments. The need arises for such a hand truck or cart which provides a relatively large lift platform for the carriage of relatively bulky articles, and which allows the load being carried to remain essentially level to preclude spillage and other problems. The cart should provide for use over a variety of surfaces without raising the center of gravity unnecessarily, while also providing advantages in leverage and storage by means of the arcuately pivotable nature of the platform relative to the remainder of the device. In addition to the above, a complementary pallet or skid providing clearance therebeneath for the lift platform of the hand truck is needed to complete the system.

DESCRIPTION OF THE PRIOR ART

U.S. Pat. No. 1,299,829 issued to Charles W. Goodyear on Apr. 8, 1919 discloses a hand truck including upward projections on the lifting forks which cooperate with a specially constructed stand to prevent slippage of the load. The forks or lifting portions are immovably affixed to the remainder of the device, unlike the present invention.

U.S. Pat. No. 3,467,405 issued to Walter K. Fogg on Sep. 16, 1969 discloses a Lever Dolly including an upward projection somewhat in the manner of the Goodyear hand truck described above. No pivoting or articulation of one component relative to another is disclosed.

U.S. Pat. No. 3,698,736 issued to Robert C. Shape on Oct. 17, 1972 discloses Combined Hand And Towing Trucks in which the lift platform may be removed from the handle portion, turned 180 degrees relative to the major axis of the handle portion, and reinstalled. However, the lift platform portion is incapable of any pivotal or articulated movement relative to the handle portion once installed thereon.

U.S. Pat. No. 4,826,388 issued to Simon S. Golding on May 2, 1989 discloses a Manhole Cover Lifter which, in one embodiment, discloses arcuately pivotable arms which are securable to a manhole cover or the like for the lifting thereof. However, the pivotal axes of the arms are perpendicular to the wheel axle, unlike the present invention, and no lifting platform is disclosed.

U.S. Pat. No. 5,123,666 issued to John W. Moore on Jun. 23, 1992 discloses a Hand Truck Attachment comprising a plurality of bars projecting forward from the handle portion for the carriage of tables and chairs. The device is installable on a standard hand truck, and no disclosure is made of any platform movement relative to the remainder of the hand truck.

French Patent No. 2,445,787 to Jean Guidetti, published on Aug. 1, 1980, discloses a hand truck for the carriage of outboard boat motors. Again, each of the elements of the hand truck is fixed relative to one another.

French Patent No. 2,493,251 to Jean Musslin, published on May 7, 1982, discloses a hand truck for the carriage of outboard boat motors and other articles. The wheels are removable and storable thereon so the device may be used as a stand. While one portion is hingedly affixed to the device, a fixed portion still extends forward from the wheel axles.

British Patent No. 2,180,801 to Black and Decker, Inc., published on Apr. 8, 1987, discloses a Convertible Hand Truck useable in the conventional manner with two support wheels, or useable as a four wheeled baggage cart or the like with minor modification. However, the lift platform portion is fixed relative to the remainder of the device.

Finally, International Patent No. 88/07951 to Craig F. Storay, published on Oct. 20, 1988, discloses A Hand Trolley in which the wheels are articulated to allow the device to pass over small obstacles more easily. However, the lift platform is immovably affixed to the handle portion in the manner of the other devices discussed above, and unlike the present invention.

None of the above noted patents, taken either singly or in combination, are seen to disclose the specific arrangement of concepts disclosed by the present invention.

SUMMARY OF THE INVENTION

By the present invention, an improved hand truck is disclosed.

Accordingly, one of the objects of the present invention is to provide an improved hand truck which provides for the level transport of loads carried thereon by means of a pivotally attached lift platform.

Another of the objects of the present invention is to provide an improved hand truck incorporating a minimal number of components, having a single handle and support for the lift platform, but which still provides a relatively wide wheelbase for stability.

Yet another of the objects of the present invention is to provide an improved hand truck which is useable over a variety of surfaces due to the interchangeability of the wheels therefor.

A further object of the present invention is to provide an improved hand truck which provides a relatively low center of gravity by means of a variable height axle, further increasing the stability thereof.

An additional object of the present invention is to provide an improved hand truck which includes a lifting platform of conventional width, which lifting platform is in turn supported by a single arm.

Another object of the present invention is to provide an improved hand truck in which the pivotally attached lift platform is biased upward toward the handle portion by means of a spring.

Still another object of the present invention is to provide an improved hand truck in which such spring interconnection between the handle portion and the pivotally connected lift platform portion is relatively light.

And another object of the present invention is to provide a complementary pallet or skid which may be used in combination with the hand truck of the present invention to provide a complete transport system for loads.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 2 is an exploded perspective view of the present invention showing its component parts and the relationship therebetween.

Similar reference characters denote corresponding features consistently throughout the several figures of the attached drawings.

DETAILED DESCRIPTION OF THE PREFERRED EMBODIMENT

Figure 1:
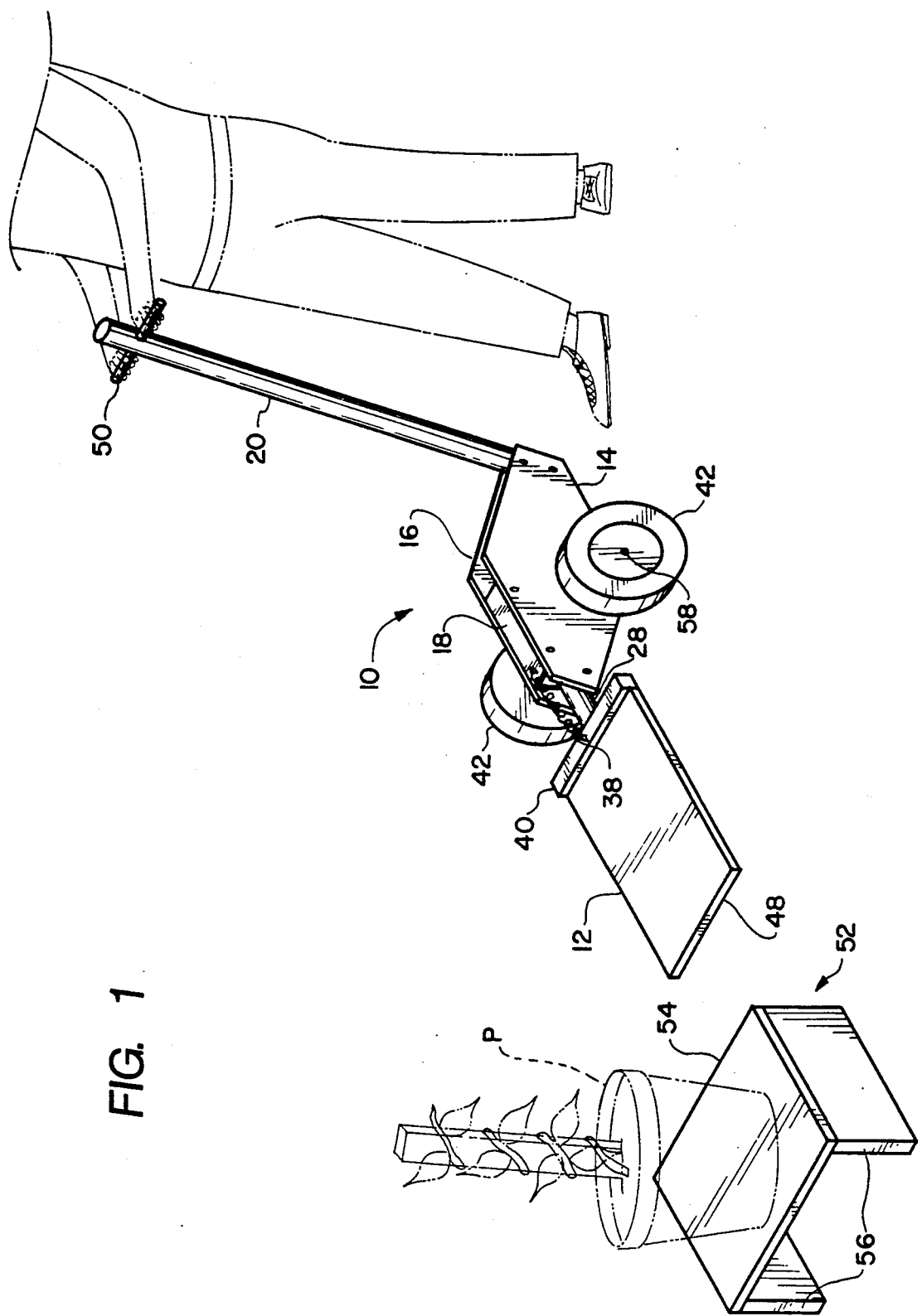
FIG. 1 is a perspective view of the present invention showing its use in the movement of another article on a pallet or skid.

Referring now to the drawings, the present invention will be seen to relate to a manually operated hand truck 10 providing for the level carriage or transport of various articles on a platform 12 pivotally attached thereto. The central portion of hand truck 10 comprises first and second parallel and spaced apart side plates or cheek plates 14 and 16, including a spacer 18 therebetween and adjacent the upper edges thereof and a handle 20 having a lower end 22 therebetween and adjacent the rear edges thereof. A plurality of bolts 24 and cooperating nuts 26 (shown in FIG. 2), or other suitable fastening means, pass laterally through cooperating holes in the side plates 14 and 16 and are used to secure the first and second side plates 14 and 16 together with the lower end 22 of the handle 20 and the spacer 18 sandwiched therebetween, in addition to other components used to construct the hand truck 10 of the present invention.

For durability and the carriage of relatively heavy loads, components 12 through 26, as well as the platform support bar 28 discussed below, may be formed of metal such as aluminum or steel. For example, the side plates 14 and 16 may be formed of aluminum or steel plate; spacer 18 may be formed of square section metal tube; and handle 20 and support bar 28 may be formed of steel or other metal pipe. However, it will be understood that hand truck 10 may be formed of lighter materials (e. g., wood or plastic sheet and rod or pipe for the side plates, spacer, handle and support bar) for ease of manipulation if only relatively light loads are to be carried.

Figure 3:
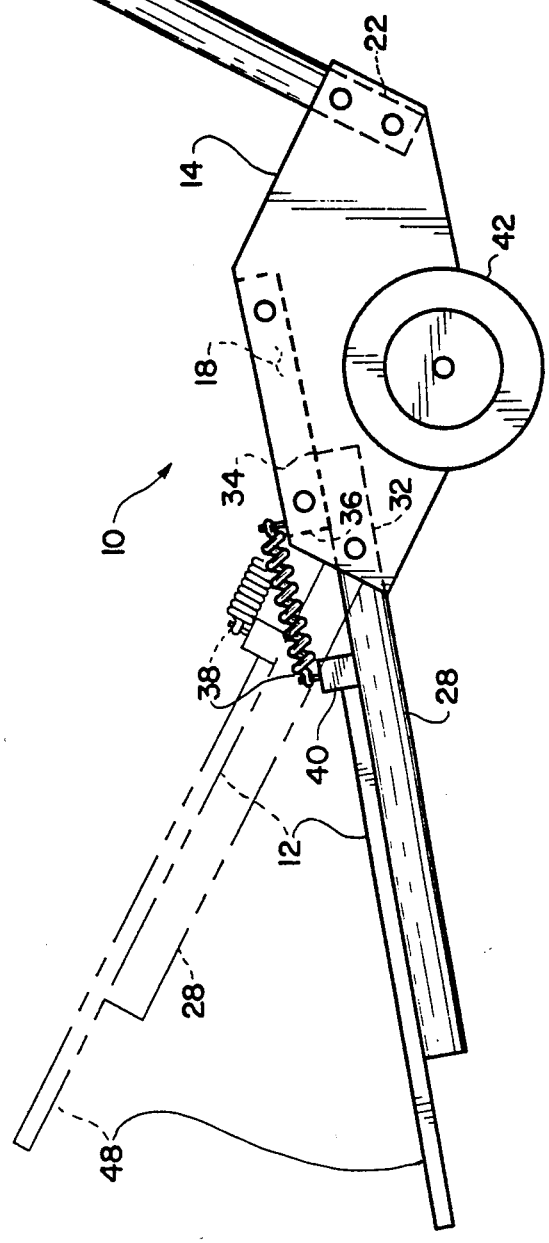
FIG. 3 is a side elevation showing the positions of the pivotally attached lift platform relative to the handle and frame of the device.

The above components 12 through 26 are each immovably secured relative to one another. However, a platform support bar 28 having a width 30 slightly less than the distance between the side plates 14 and 16, is pivotally installed therebetween by means of the lateral lower front bolt or fastener 24 through the attachment end 32. Support bar 28 is free to pivot downward about its attachment bolt or fastener 24 to the limit reached when the attachment end 32 contacts the underside 34 of the forward end 36 of spacer 18 and is stopped from further pivotal movement in that direction, as shown in FIG. 3. On the other hand, support bar 28 may be raised upward relative to the handle until stopped by contact with the forward end 36 of the spacer 18, thus providing great flexibility in the position of the support bar 28 relative to the central portion and handle of hand truck 10.

Support bar 28 provides support for platform 12 affixed thereto; platform 12 is bolted or otherwise permanently affixed to support bar 28. It will be seen that as the support bar 28 pivots about its attachment fastener 24, so will platform 12; the resulting angle between the platform 12 and the handle 20 of hand truck 10 may be varied as required, but will generally be an included angle between 90 and 135 degrees. Greater (or lesser) range of travel may be achieved by adjusting the pivot point of support bar 28 and/or the end 36 of the spacer 18 relative to one another. In order to maintain the handle 20 of hand truck 10 in an upright position when hand truck 10 is not in use, a tension spring 38 extends between the platform 12 and the central portion of hand truck 10. The ends of spring 38 may be secured to a lateral stop 40 attached to platform 12 and to the spacer 18, or otherwise positioned to achieve the same result.

Hand truck 10 is further equipped with wheels 42, respectively secured to each end of an axle 44 (FIG. 2) which passes laterally through both plates 14 and 16, parallel to bolts or fasteners 24. Typically, hand trucks are provided with a relatively wide frame having the wheels relatively widely spaced to either side thereof for greater lateral stability. As the central portion of hand truck 10 is relatively narrow, lateral stability is provided by means of a relatively long axle 44 and a pair of lateral axle spacers 46 (FIG. 2), one positioned between each wheel 42 and its respective side plate 14 or 16. Thus, stability is achieved for the platform support bar 28 and the platform 12 secured thereto by means of the adjacent closely spaced side plates 14 and 16, yet at the same time lateral stability for hand truck 10 in general is achieved by means of the relatively widely spaced wheels 42.

Normally, hand truck 10 will assume a rest position with the handle 20 in an upright position, due to the spring 38 drawing the platform 12 and remaining portion of hand truck 10 together. Due to the relatively long moment arm of the platform 12 and its associated support 28, platform 12 and support 28 will generally remain in position resting upon the surface beneath, while the handle 20 will be drawn upward to an essentially vertical position. Conversely, when hand truck 10 is used to transport an article such as the potted plant P shown in FIG. 1, the platform 12 will remain in a lowered position essentially parallel to the surface (or with the forward end 48 resting upon the surface) as the handle 20 is lowered from the vertical, even without a load upon the platform 12, until handle 20 (and the central portion of hand truck 10 affixed thereto) causes platform 12 to be lifted clear of the surface by means of the step provided by the lower side 34 of spacer 18, as discussed above. Hand truck 10 may then be pushed or pulled by means of handle 20, and handlebar 50 in the upper end thereof, in a lowered position for ease of use by the operator, while still maintaining a level position for the platform 12 to preclude the spillage of any loads thereon.

An example of the above usage is shown in FIG. 1, wherein a potted plant P is shown resting upon a pallet or skid 52. Pallet 52 comprises an upper stand portion 54 supported by two laterally spaced apart support legs 56. Pallet 52 may be constructed of any suitable materials, such as aluminum or steel, plastic, or wood. The distance between the support legs 56 of pallet 52 is at least slightly greater than the width of platform 12 of hand truck 10, thus enabling platform 12 to be inserted between the support legs 56. The handle 20 of lift truck 10 is then lowered as is conventional with hand trucks for ease of operation, which causes platform 12 to be raised as the stop means of spacer 18 is engaged. Pallet 52, and any load such as plant P positioned thereon, is then raised clear of the surface and may be transported in a level attitude to another location as desired, even though the handle 20 of the lift truck 10 has been lowered for ease of operation. When pallet 52 and its load are positioned as desired, the handle 20 of lift truck 10 may be raised to allow the support platform to lower to the surface in order to lower pallet 52 to the surface. The handle 20 may then be further raised to the vertical for the storage of hand truck 10 in order to conserve space. Thus, the hand truck 10 of the present invention provides for the level carriage of any loads supported thereby, as the handle 20 is manipulated from the vertical for ease of use.

Figure 4:
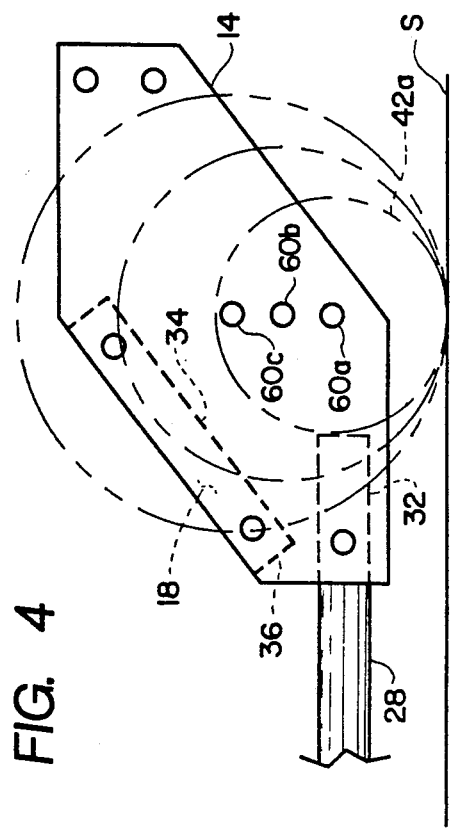
FIG. 4 is a side elevation of a side plate of the frame of the present invention, showing the alternate installation of various wheels and the axle positions therefor.

Another feature of hand truck 10 is the capability of accepting wheels of different diameters while still maintaining the same ground clearance and relatively low center of gravity for proper stability. It is well known that larger diameter wheels offer less rolling resistance on relatively soft surface; the hand truck 10 of the present invention provides for use on a variety of surfaces by means of the interchangeability of different diameter wheels. For example, relatively small diameter wheels may be all that is needed for operation on a hard surface (paved driveway, sidewalk, etc.) and may be desirable for adequate clearance in a given operation. Wheel 42a shown in FIG. 4 is an example of the above. On the other hand, a larger diameter wheel 42b or 42c may be desirable for operation on a lawn or other soft or uneven surface. Hand truck 10 provides for the interchangeability of such different wheels 42a through 42c by means of the ease of removal provided by wheel securing nut 58 or other means (e. g., retaining pin) shown in FIG. 1.

However, if larger diameter wheels 42c are installed without changing the position of the axle 44, the center of gravity of hand truck 10 will be raised by the increase in radius of the larger wheel. Accordingly, a series of lateral axle holes 60a through 60c are provided to position the axle 44 in order to maintain a relatively low center of gravity for hand truck 10. The vertical spacing between each axle hole 60a through 60c and its vertically adjacent axle hole is equal to the difference in radius of the different sizes of wheels 42a through 42c which might be installed; e. g., if it is desired to go from six inch diameter (three inch radius) wheels to ten inch diameter (five inch radius) wheels, the axle would be moved to an axle hole two inches above the original hole. Thus, when it is desired to install larger diameter wheels, one wheel may be removed, the axle 44 removed from the side plates 14 and 16 along with the axle spacers 46, and the axle repositioned as desired in another appropriate axle hole. The resulting repositioning of the axle 44 to accommodate different wheel sizes 42a through 42c will be seen to maintain the center of gravity and the clearance of hand truck 10 at a constant height above the surface S as shown in FIG. 4.

In accordance with the above, a hand truck 10 providing for the manipulation and level carriage and transport of a variety of loads over variable surfaces is disclosed, along with a pallet 52 useful in combination with the lift truck 10 of the present invention. The ability of the hand truck 10 of the present invention to provide for the level carriage of loads by means of the pivotally attached platform when the handle is other than vertical, serves to preclude spillage of such loads and further serves to maintain the center of gravity of the load close to the surface for stability. The capability of accepting different wheels for operation on different surfaces without raising the center of gravity, is also of great value.

It is to be understood that the present invention is not limited to the sole embodiment described above, but encompasses any and all embodiments within the scope of the following claims.

I claim:

1. A manually operated hand truck apparatus providing for the level carriage of loads thereon over a surface, comprising:

parallel first and second side plates including lateral axle passage means and a spacer affixed therebetween to establish a space therebetween;

an elongate handle having an upper and a lower end, with said lower end affixed between said first and second side plates;

an axle with two ends each having a wheel affixed thereto, and positioned through said axle passage means of said side plates;

said side plates including pivot means laterally disposed therethrough and providing a pivot axis parallel to said axle;

a support bar having a first attachment end and an opposite second end, with said attachment end pivotally secured within said space between said side plate by said pivot means; and a support platform having a forward and a rearward end, with said support platform forward end secured to said support bar second end and said support platform rearward end secured to said support bar adjacent said support bar attachment end, whereby;

said hand truck is manipulated by means of said handle with said support bar second end resting upon the surface and said support platform is positioned beneath a load to be carried, said handle is lowered to cause said support bar and said support platform to pivotally raise relative to said handle to lift the load, and said handle is maintained in a position to keep said support platform level and parallel to the surface as said hand truck is moved, in order to preclude spillage of the load thereon.

2. The hand truck apparatus of claim 1 wherein:
said spacer includes an underside and a forward end, with said spacer underside and forward end comprising stop means respectively limiting the downward and upward pivotal travel of said support bar and said support platform.

3. The hand truck apparatus of claim 1 wherein:
said wheels are removably affixed to said axle ends to provide for the installation of different said wheels having different diameters for use over different surfaces.

4. The hand truck apparatus of claim 3 wherein:
said side plates include a plurality of pairs of vertically spaced lateral axle passage means therethrough, with each of said pairs of axle passage means corresponding to an axle position for a specific one of said wheel diameters, whereby;
said axle is removably installed in one of said pairs of axle passage means according to said specific wheel diameter removably affixed to said axle with a higher one of said pairs of axle passage means used with said wheels having larger diameters to provide a center of gravity of constant height.

5. The hand truck apparatus of claim 1 including:
a tension spring disposed between said support platform rearward end and said spacer, whereby;
said spacer and components directly and indirectly affixed thereto, including said handle, are urged to an upright position when said platform support bar is resting upon the surface.

6. The hand truck apparatus of claim 1 wherein:
said axle is substantially longer than the distance established by said space between said side plates to provide a substantially wider distance between said wheels; and
an axle spacer is installed on said axle between each said wheel and each said side plate; whereby
the stability of said hand truck is increased by means of said substantially wider distance between said wheels.

7. The hand truck apparatus of claim 1 including:
handlebar means extending from said handle upper end.

8. The hand truck apparatus of claim 1 including:
a lateral stop extending across said support platform and adjacent said rearward end of said support platform.

9. The hand truck apparatus of claim 1 including:
a separate pallet providing for the placement thereon of articles transportable by said hand truck and providing for the level lifting thereof by said support platform.

10. The hand truck apparatus of claim 9 wherein:
said pallet comprises a planar stand portion supported by two spaced apart leg portions defining a space therebetween, whereby;
said support platform is inserted beneath said planar stand portion and between said spaced apart leg portions and said hand truck is manipulated to lift said pallet from the surface by means of said support platform for the level transport of said pallet and any article thereon.

11. The hand truck apparatus of claim 9 wherein:
said pallet is formed of metal.

12. The hand truck apparatus of claim 9 wherein:
said pallet is formed of plastic.

13. The hand truck apparatus of claim 9 wherein:
said pallet is formed of wood.

14. The hand truck apparatus of claim 1 wherein:
at least said side plates, said spacer therebetween, said handle, said support bar, and said axle are formed of metal.

15. The hand truck apparatus of claim 1 wherein:
at least said side plates, said spacer therebetween, said handle, and said support bar are formed of plastic.

16. The hand truck apparatus of claim 1 wherein:
at least said side plates, said spacer therebetween, said handle, and said support bar are formed of wood.

* * * * *